United States Patent
Shtyrov et al.

(10) Patent No.: US 10,672,056 B2
(45) Date of Patent: Jun. 2, 2020

(54) SYSTEMS AND METHODS FOR RECOMMENDING SOFTWARE BASED ON USER SIMILARITY

(71) Applicant: Avast Software s.r.o., Prague (CZ)

(72) Inventors: Denis Shtyrov, Woerth am Rhein (DE); Thomas Salomon, Neukirch (DE)

(73) Assignee: Avast Software s.r.o., Prague (CZ)

(*) Notice: Subject to any disclaimer, the term of this patent is extended or adjusted under 35 U.S.C. 154(b) by 396 days.

(21) Appl. No.: 15/472,474

(22) Filed: Mar. 29, 2017

(65) Prior Publication Data

US 2017/0287048 A1 Oct. 5, 2017

Related U.S. Application Data

(60) Provisional application No. 62/315,956, filed on Mar. 31, 2016.

(51) Int. Cl.
*G06Q 30/00* (2012.01)
*G06Q 30/06* (2012.01)

(52) U.S. Cl.
CPC .............. *G06Q 30/0631* (2013.01)

(58) Field of Classification Search
CPC ................................ G06Q 30/0631
See application file for complete search history.

(56) References Cited

U.S. PATENT DOCUMENTS

| | | | |
|---|---|---|---|
| 8,452,797 B1 | 5/2013 | Paleja et al. | |
| 8,484,636 B2 * | 7/2013 | Mehta | G06F 8/60 717/176 |
| 9,471,624 B1 * | 10/2016 | Patil | G06F 8/62 |
| 2011/0307354 A1 * | 12/2011 | Erman | G06F 8/60 705/27.1 |
| 2013/0326499 A1 | 12/2013 | Mowatt et al. | |

(Continued)

FOREIGN PATENT DOCUMENTS

WO 2015117682 A1 8/2015

OTHER PUBLICATIONS

AT&T Intellectual Property I, L.P.; patent issued for local peer-to-peer network for providing recommendations and enforcing security policies (USPTO 9485615). (Nov. 14, 2016). Journal of Engineering Retrieved from https://search.proquest.com/docview/1837722437?accountid=14753.*

(Continued)

*Primary Examiner* — Kathleen Palavecino
(74) *Attorney, Agent, or Firm* — Erickson Kernell IP, LLC

(57) ABSTRACT

Systems and methods for determining software recommendations for a user. A first application list of applications installed on a user's computer is received. A distribution score is determined for each application in the first application list. A set of least distributed applications is determined based on the distribution score. A similarity score is determined for each user in a set of users having one or more applications of the set of least distributed applications installed on their respective systems. A second list of applications is determined based on applications installed by users in the set of users having a similarity score above a threshold. Recommendations for applications in the first list of applications are determined based, at least in part, on typicality scores for the applications.

12 Claims, 4 Drawing Sheets

(56) References Cited

U.S. PATENT DOCUMENTS

| | | | | |
|---|---|---|---|---|
| 2014/0012924 A1* | 1/2014 | Jagernauth | ............. | G06Q 50/10 709/206 |
| 2015/0074106 A1* | 3/2015 | Ji | ......................... | G06F 16/284 707/736 |
| 2015/0106801 A1* | 4/2015 | Agrawal | ................... | G06F 8/60 717/177 |
| 2016/0171589 A1* | 6/2016 | Glover | ............... | G06Q 30/0631 705/26.7 |
| 2016/0294961 A1* | 10/2016 | Cordes | ................... | H04L 67/22 |

OTHER PUBLICATIONS

Google Play, https://play.google.com/store, Accessed Jun. 26, 2017.
IronSource—creating a sustainable digital content economy, https://www.ironsc.com, Accessed Jun. 26, 2017.
OpenCandy, https://en.wikipedia.org/wiki/OpenCandy, Accessed Jun. 26, 2017.
Should I Remove It? Helping you decide which PC Programs to purge, http://www.shouldiremoveit.com/, Accessed Jun. 26, 2017.
AdwCleaner—Free download and software reviews—CNET Download.com., http://downloadcnet.com/AdwCleaner/3000-8022_4-75851221.html.

\* cited by examiner

SYSTEMS AND METHODS FOR RECOMMENDING SOFTWARE BASED ON USER SIMILARITY

CROSS-REFERENCE TO RELATED APPLICATIONS

This application claims priority to U.S. provisional application No. 62/315,956, filed Mar. 31, 2016, which is hereby incorporated by reference in its entirety.

FIELD

The disclosure relates generally to computing systems, and more particularly, to systems and methods for providing recommendations for software based on similarity with other users.

BACKGROUND

"Bloatware" is a common problem user's experience with their computing devices. Bloatware is a term used to describe unnecessary software that consume storage resources, and may also consume processor resources. Bloatware can come from a number of sources. For example, a newly purchased computing device such as a personal computer, laptop computer, tablet computer or smart phone typically has software pre-installed. While some of the pre-installed software is necessary for the normal operation of the computing device, bloatware is not necessary. Examples of bloatware include trial versions of software and software that includes advertisements for products. Bloatware can cause a computing device to take longer to boot, clutter the desktop, and consume valuable storage space.

BRIEF DESCRIPTION OF THE DRAWINGS

For a better understanding of the disclosure, reference may be made to the accompanying drawings in which.

DETAILED DESCRIPTION

Figure 1:
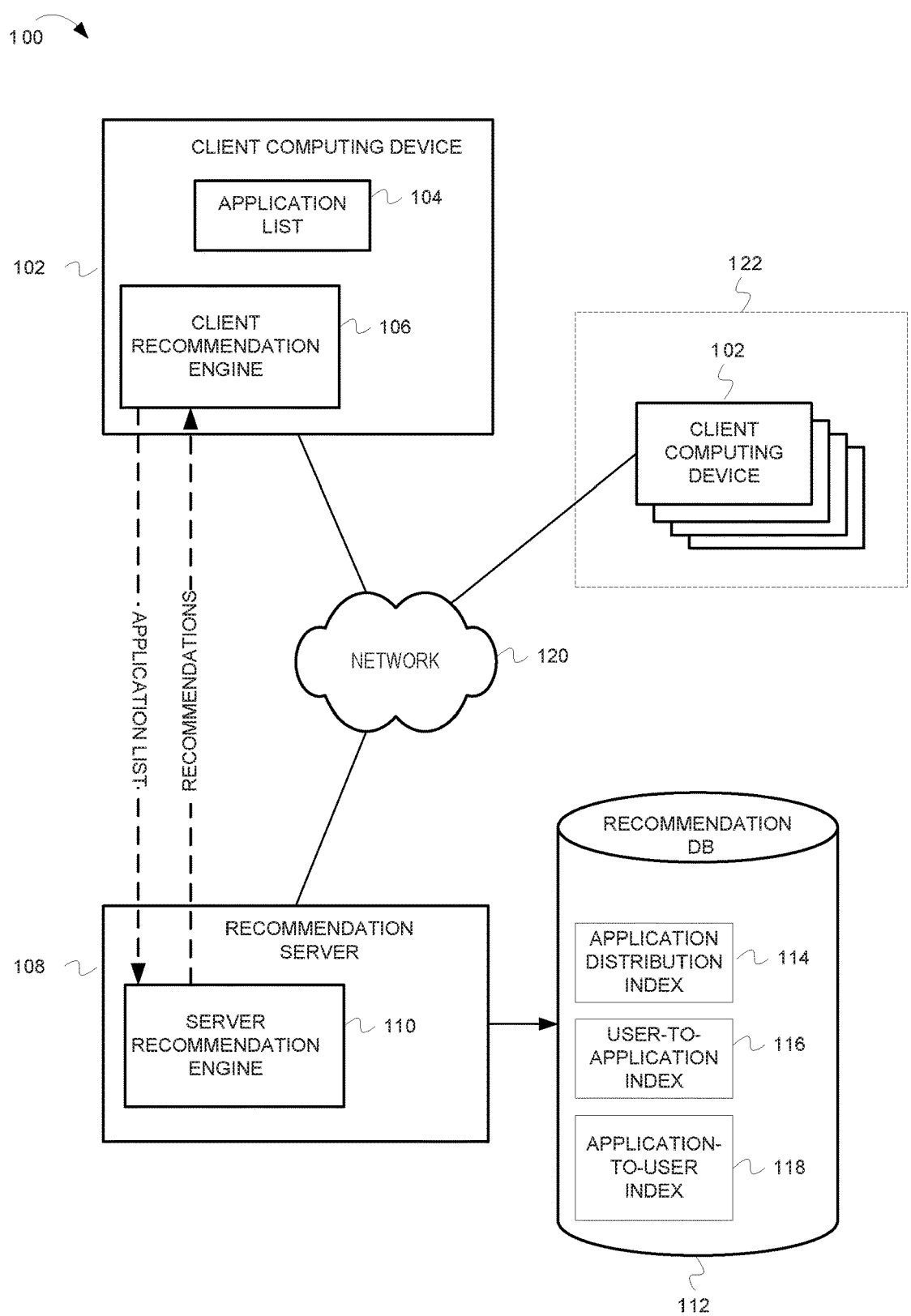
FIG. 1 is a block diagram illustrating an example of a system for providing recommendations regarding software programs.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The disclosure provides details of various systems and methods that can include a recommendation engine that creates an individual recommendation for a user regarding a software list of applications on a user's computing device. "Individual recommendation" means that the recommendation engine can search for other similar users in a user base, finds the typical software of this user group and calculate the difference to it which then results in a software recommendation. Based on the differences, the recommendation can be KEEP (recommended to keep this already installed software), INSTALL (recommended to install a new software) or REMOVE (ask the user to remove the already installed software). The various aspect of the disclosure can provide cloud based software install or removal recommendations that are individual to a user based on his currently installed software in comparison to the software of other users.

FIG. 1 is a block diagram illustrating an example of a system 100 for providing recommendations regarding software applications. In some aspects, system 100 includes a client computing device 102 and a recommendation server 108 communicably coupled via a network 120. In some aspects, network 120 can be a local area network, wide area network, intranet, or other type of network. In some aspects, network 120 can be the Internet.

Client computing device 102 and recommendation server 108 can be any type of device with one or more processors to execute software programs. Examples of such devices include a desktop computer, server computer, laptop computer, tablet computer, mainframe computer, smart phone, personal digital assistant, set top box, or any other computing device capable of executing the methods described herein (see also example of FIG. 4).

Client computer 102 creates and/or maintains an application list 104. In some aspects, application list 104 comprises a list of the applications installed on client computer 102. An application may include one or more programs that are distributed along with the application. In some aspects, the creation and maintenance of application list 104 can be a function of client recommendation engine 106.

Recommendation server 108 maintains a recommendation database 112. In some aspects, recommendation database 112 includes an application distribution index 114, a user-to-application index 116, and an application-to-user index 118. In some aspects, server recommendation engine 110 can receive application lists 104 from client computers 102 in a user base 122 and use the application lists to create and maintain the application distribution index 114, user-to-application index 116, and application-to-user index 118.

Application distribution index 114 includes data that provides a mapping between an application and a distribution score associated with the application. In one embodiment, each application that is received via an application list 104 is assigned a unique program identifier (PID) by the server recommendation engine 100 of server 108. In some aspects, the PID is a customizable mapping between a full application name to a unique identifier (ID). The ID can be numerical or string based. The mapping can be either a one to one mapping or a many to one mapping. In the case of a many to one mapping, normalization may be applied to the application identification data by some normalization. In some aspects, the normalization includes identifying identical applications based on their name. Redundant parts of the application name (version numbers, platform type, install path) can removed as part of the normalization.

The PID of an application is used to map the application to its distribution score:

$$P_i \rightarrow D_i$$

where P is the set of PIDs, $1<=i<=|P|$, $P_i$ is a member of P, and $D_i$ is the distribution score associated with the $i^{th}$ PID in P. In some aspects, the distribution score $D_i$ is a rational number where $0<D_i<=1$. In some aspects, the distribution score can be the number of users using an application divided by total number of users.

User-to-application index 116 includes data that provides a mapping between a user and a list of PIDs associated with the applications in the application list 104 of the user's client computing device 102. In some aspects, each unique user is assigned a globally unique identifier (GUID). The index maps GUIDs to PIDs:

$$G_i \rightarrow L_i$$

where G is the set of GUIDs, $1<=i<=|G|$, $G_i$ is a member of G, $L_i$ is a subset of P and is the list of PIDs of the applications associated with the $i^{th}$ GUID in G.

Application-to-user index 118 is a reverse index of the user-to-application list 116. It can provide a mapping between the set of PIDs and their GUIDs:

$$P_j \rightarrow S_j$$

where S is a set of lists of GUIDs, $1<=j<=|P|$, $S_j$ is a subset of S, $P_j$ is a member of P, and Sj is the list of GUIDs of users where the application having the $j^{th}$ PID in P is installed on the user's client computing device 102.

Figure 2:
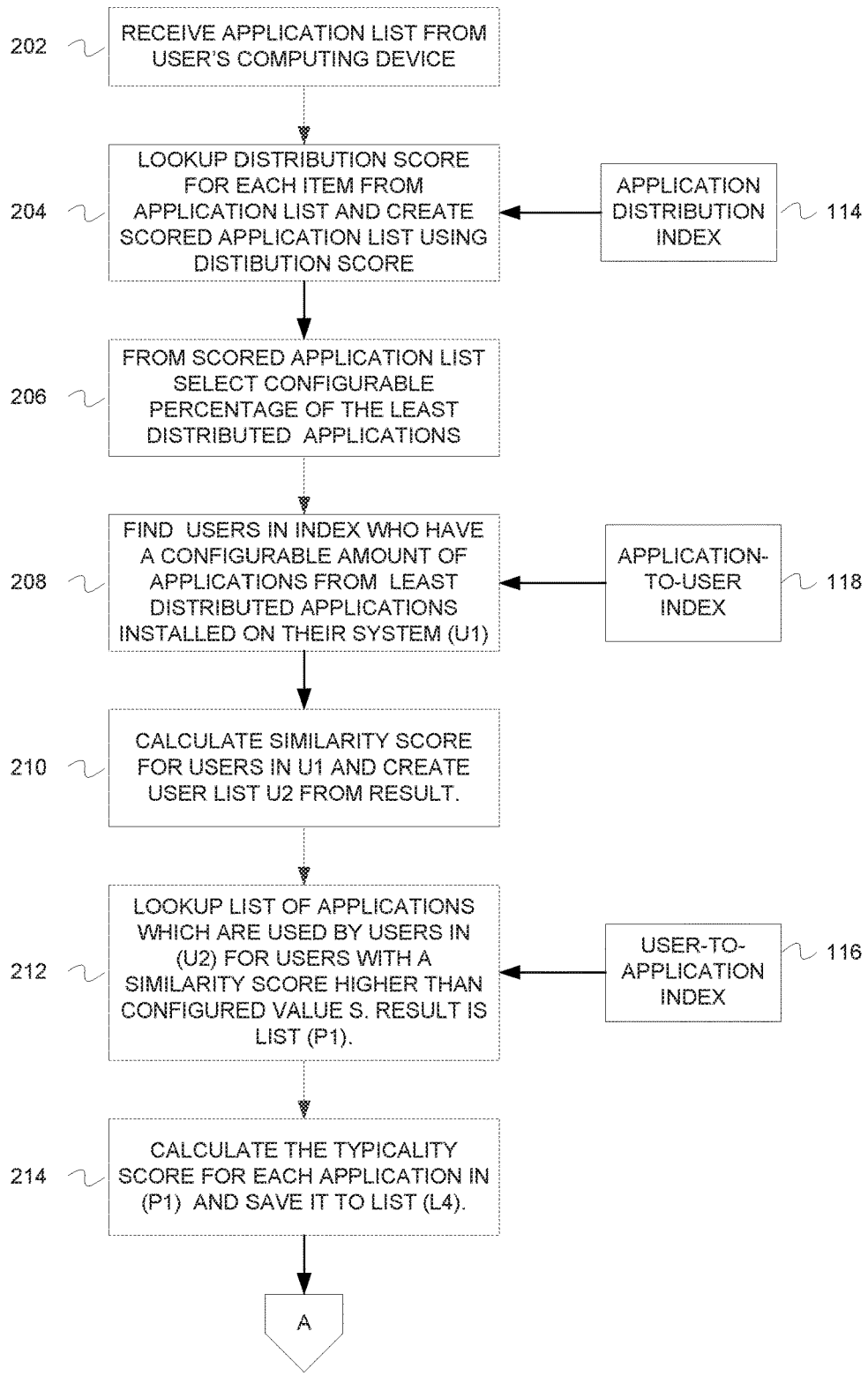
FIG. 2 is a flow chart illustrating operations of an example method for comparing a user's installed applications with other similar users.

FIG. 2 is a flow chart illustrating operations of a method for comparing a user's installed applications with other similar users.

At block 202, an application list 104 (referred to as "L1") is received from a user's computing device. In some aspects, the application list is a complete list of applications installed on the user's computer and is received at the recommendation engine 110 of server 108. The applications in the application list are associated with a PID. If the application has been seen before, it is assigned an existing PID associated with the application. If the application is a new application that has not been seen before, a new unique PID is generated and assigned to the application.

At block 204, the application distribution index 114 is used to look up a distribution score for each application in the application list. A new application list (referred to as "L2") is generated that has the PID and the associated distribution score.

At block 206, a percentage of the least distributed applications is selected from the new application list L2. The percentage can be a predetermined or configurable percentage. In some aspects, the percentage can be 20%. In other words, the first 20% of the least distributed applications are selected. In some aspects, applications with a distribution score of zero are excluded. The selected applications are used to form a least distributed list (referred to as L3).

At block 208, the application-to-user index 118 is used to find users in the index that have at least one application from the least distributed list L3 installed on their system. The found users are placed in a list (referred to as U1).

At block 210, a similarity score is calculated for each of the users in U1. In some aspects, the similarity score is calculated as the number of applications for each user in U1 divided by total number of applications in L3 for all users in (U1). The resulting similarity score is a value between 0 and 1, where a value of 1 indicates that the user has all the applications from the list L3, and a value of 0 means no similarity at all. A new user list (referred to as U2) is formed that includes each user's GUID from U1 associated with the similarity score for the user.

At block 212, the user-to-application index 116 is used to determine a list of applications (referred to as P1) that are used by users in U2 that have a similarity score greater than a predetermined or configurable threshold value S. In some aspects, the threshold value is in a range of 0.6 to 0.8.

At block 214, a typicality score is determined for each application in P1. In some aspects, the typicality score is determined by dividing the count of the number of users of the application in P1 by the total number of users in U2. A new list (referred to as L4) is formed that has each application in P1 and its associated typicality score.

Figure 3:
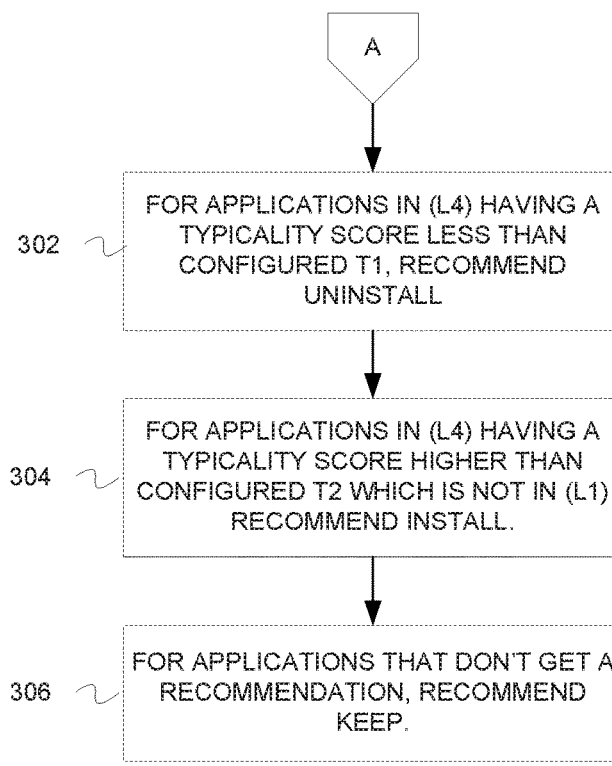
FIG. 3 is a flow chart illustrating operations for an example method of providing a recommendation based on the comparison of a user's installed applications with other similar users.

FIG. 3 is a flow chart illustrating operations for a method of providing a recommendation based on the comparison of a user's installed applications with other similar users. The operations in blocks 302-306 may be performed for each application in L4 (determined at block 214 of FIG. 2).

At block 302, a recommendation is generated to uninstall the application if the typicality score associated with the application is less that a predetermined or configurable threshold T1 and the application is in L1 (the list of applications from the user's computing device). In some aspects, the value can be at or near 0.25. However, the value can be adjusted based on user feedback.

At block 304, a recommendation is generated to install the application if the application does not appear in L1 and the typicality score is higher than a predetermined or configurable threshold T2. In some aspects, the value of T2 can be at or near 0.75. Again, user feedback can be used to adjust the threshold value T2.

At block 306, a recommendation is generated to keep the application if the operations at block 302 and 304 did not result in a recommendation being made to install or uninstall. The recommendations may be coupled to the client user device 102 for display to the user, or, in some embodiments, the recommendation can be automatically implemented either after prompting for the user's authorization or without any user intervention.

Figure 4:
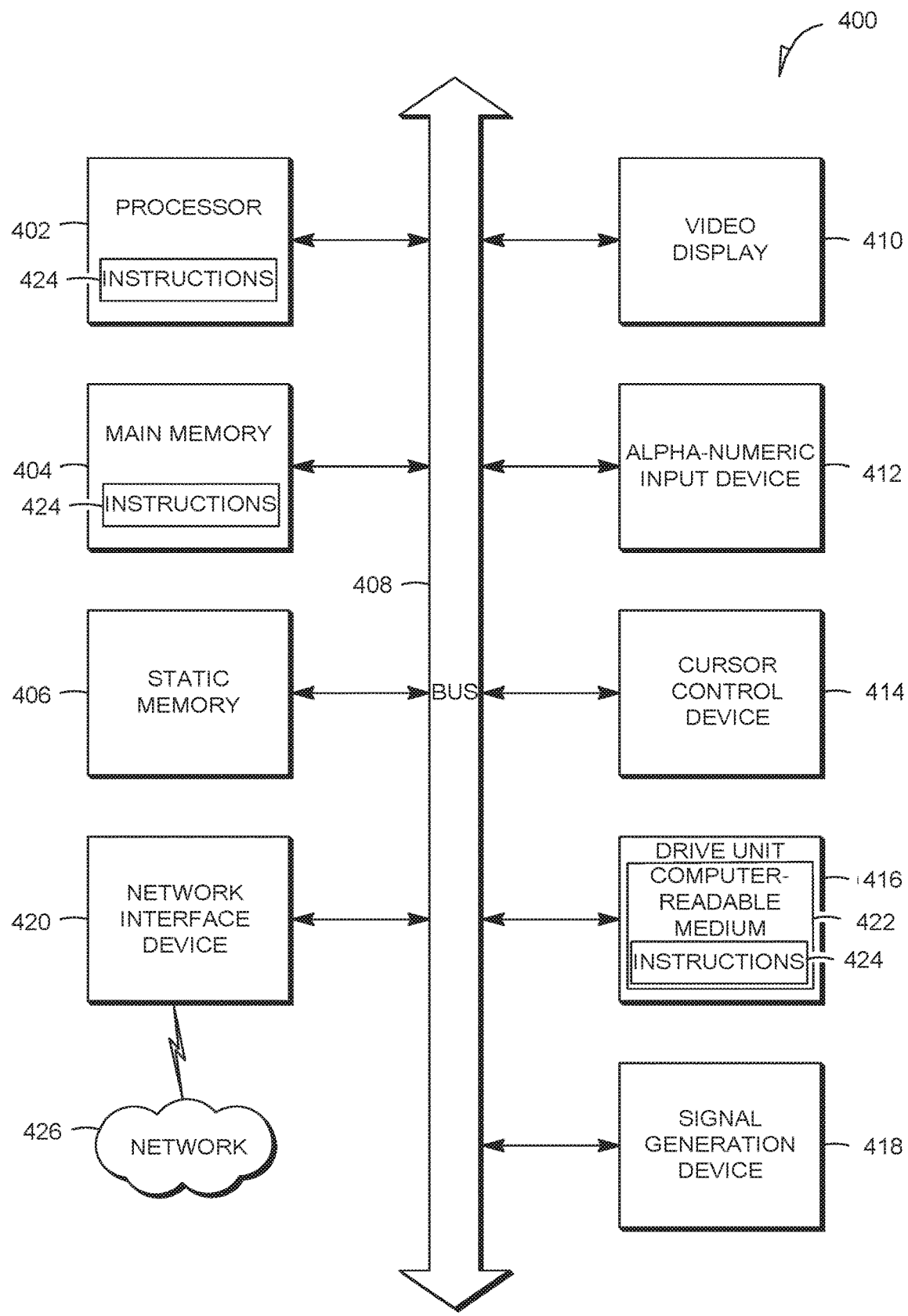
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the aspects of the disclosure may be practiced with other computer system configurations, including hand-held devices, multiprocessor systems, microprocessor-based or programmable consumer electronics, smart phones, network PCs, minicomputers, mainframe computers, and the like. Aspects of the disclosure may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A system for providing software selection recommendations comprising:
   a user computing device including a first application list of a plurality of applications installed on the user's computer device;
   a recommendation database device storing an application distribution index;
   a recommendation server, coupled to the user computing device and the recommendation database device and including a recommendation engine which receives the first application list and determines a distribution score for each application in the first application list based at least in part on the application distribution index retrieved from the recommendation database device, determines a set of least distributed applications based at least in part on the distribution scores, and determines a set of users having one or more applications of the set of least distributed applications installed on a respective system of each user of the set of users;
   for each user in the set of users, the recommendation server configured to determine a similarity score for each user, and to determine a second list of applications based at least in part on applications installed by users of the set of users having a similarity score above a threshold; and
   for at least one application in the first application list, the recommendation server configured to determine a recommendation for the at least one application based, at least in part, on a typicality score for the at least one application,
   wherein in response to the typically score for the at least one application being higher than a threshold value, the recommendation server configured to determine a recommendation to install a new application, and
   wherein in response to the typicality score for the at least one application being less than a threshold, the recommendation server configured to determine a recommendation to uninstall the application.

2. The system of claim 1 wherein the recommendation server is configured to determine the distribution score in accordance with a total number of users having the application installed and a total number of users.

3. The system of claim 1 wherein the recommendation server is configured to determine the similarity score in accordance with a total number of applications from the set of least distributed applications which are installed on the user's computer device and a total number of applications in the set of least distributed applications.

4. The system of claim 3 further comprising the recommendation server configured to determine the typicality score for each application in the second list of applications and wherein the determining the typicality score for each such application comprises determining the typicality score in accordance with a count of all users in the set of users that have installed the application and a count of all users in the set of users.

5. The system of claim 1 wherein the threshold is one of predetermined and configurable.

6. The system of claim 1 wherein the recommendation is automatically implemented on the user computer device.

7. A method for providing software recommendations, the method comprising:
   receiving a first application list, the first application list having a plurality of applications installed on a user's system;
   for each application in the first application list, determining a distribution score;
   determining a set of least distributed applications based, at least in part, on the distribution scores;
   determining a set of users having one or more applications of the set of least distributed applications installed on a respective system of each user of the set of users;
   for each user in the set of users, determining a similarity score;
   determining a second list of applications based, at least in part, on applications installed by users in the set of users having a similarity score above a threshold; and
   for at least one application in the first application list, determining a recommendation for the at least one application based, at least in part, on a typicality score for the at least one application,
   in response to the typicality score for the at least one application being higher than a threshold value, determining a recommendation to install a new application; and
   in response to the typicality score for the at least one application being less than a threshold, determining a recommendation to uninstall the application.

8. The method of claim 7, wherein determining the distribution score comprises determining the distribution score in accordance with a number of users having the application installed and a total number of users.

9. The method of claim 7, wherein determining the similarity score comprises determining comprises determining the similarity score in accordance with a total number of applications from the set of least distributed applications installed on the user's system and a total number of applications in the set of least distributed applications.

10. The method of claim 9, further comprising determining the typicality score for each application in the second list of applications, wherein the determining the typicality score for each application comprises determining the typicality score in accordance with a count of all users in the set of users that have installed the application and a count of all users in the set of users.

11. The method of claim 7 wherein the threshold is one of predetermined and configurable.

12. The method of claim 7 wherein the recommendation is automatically implemented on the user computer device.

* * * * *